United States Patent [19]
Shafir

[11] Patent Number: 5,346,656
[45] Date of Patent: Sep. 13, 1994

[54] PROCESS FOR RECLAIMING SCRAPS OF CRAYON

[76] Inventor: Grace Shafir, 600 Sylvan Ave., Englewood Cliffs, N.J. 07632

[21] Appl. No.: 55,539

[22] Filed: Apr. 30, 1993

[51] Int. Cl.$^5$ .............................................. B29C 35/00
[52] U.S. Cl. ........................................ 264/26; 264/73; 264/330; 264/DIG. 69
[58] Field of Search ............... 264/25, 37, DIG. 66, 264/DIG. 69, 26, 73, 330; 425/803, DIG. 13, DIG. 110

[56] References Cited

U.S. PATENT DOCUMENTS

| | | | |
|---|---|---|---|
| 303,814 | 8/1884 | Cowdery | 425/803 |
| 381,810 | 4/1888 | Peck | 425/803 |
| 383,174 | 5/1988 | Fuchs | 425/803 |
| 3,166,792 | 1/1965 | Goldfarb | 425/803 |
| 4,885,108 | 12/1989 | Richter | 264/25 |

Primary Examiner—Jan H. Silbaugh
Assistant Examiner—Christopher A. Fiorilla
Attorney, Agent, or Firm—Ostrolenk, Faber, Gerb & Soffen

[57] ABSTRACT

A new crayon is made by loading a charge of crayon scraps into a non-metallic cylindrical mold that is coated internally with a vegetable oil release agent. The loaded mold is then placed in a domestic microwave oven and the charge of crayon scraps is heated by microwave energy until the charge becomes a molten mass, The mass is cooled and thereby solidified and is then ejected as a solid mass from the mold through its open top by removing the bottom of the mold and applying an upwardly directed force to the bottom of the solid mass to move same upward, 7 Claims, 2 Drawing Sheets

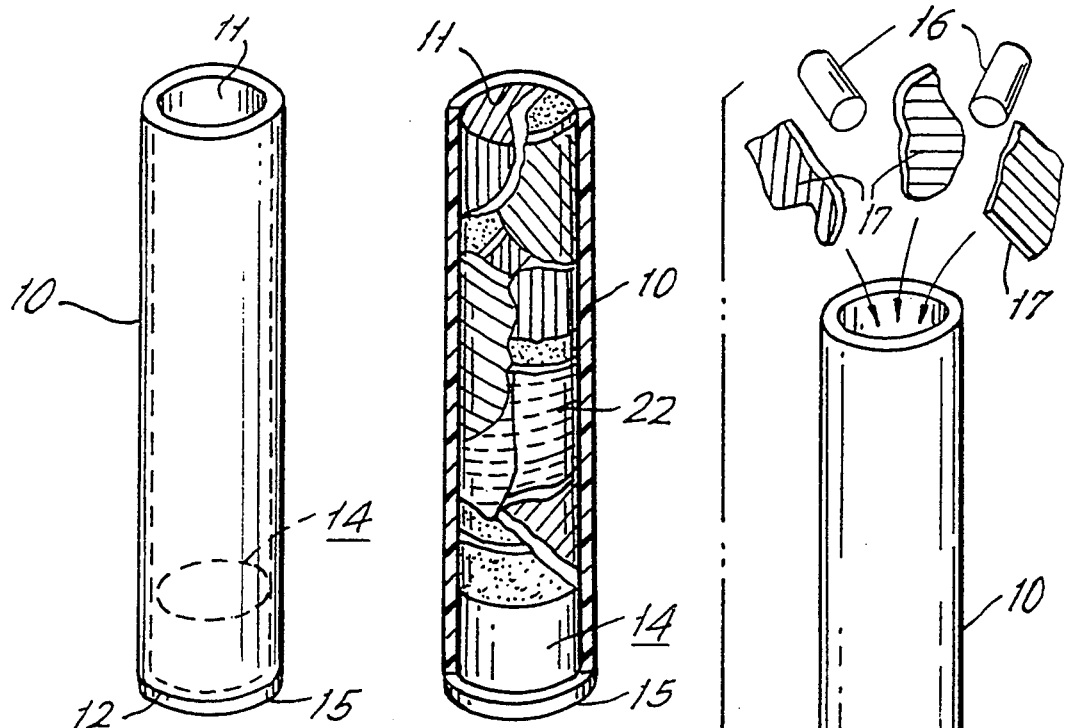
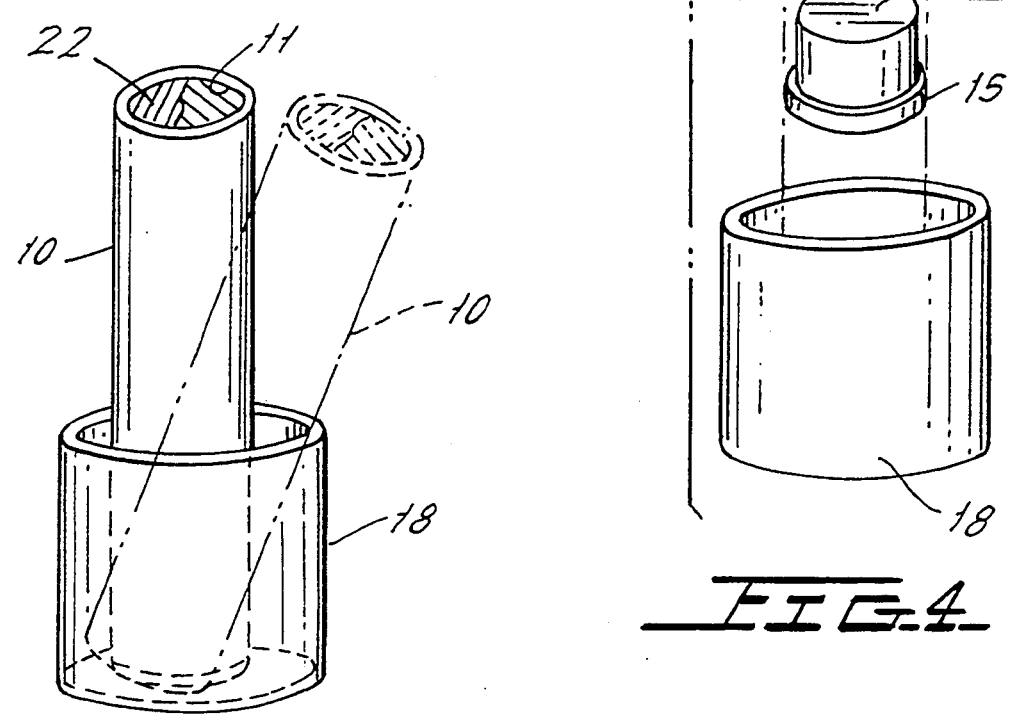

U.S. Patent  Sep. 13, 1994  Sheet 2 of 2  5,346,656
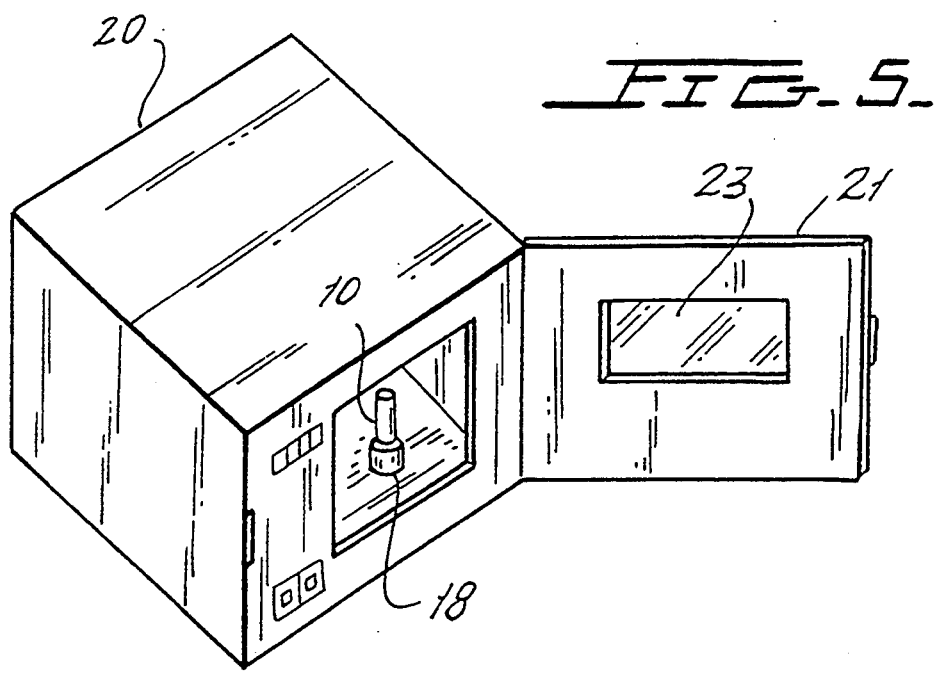
FIG. 5.
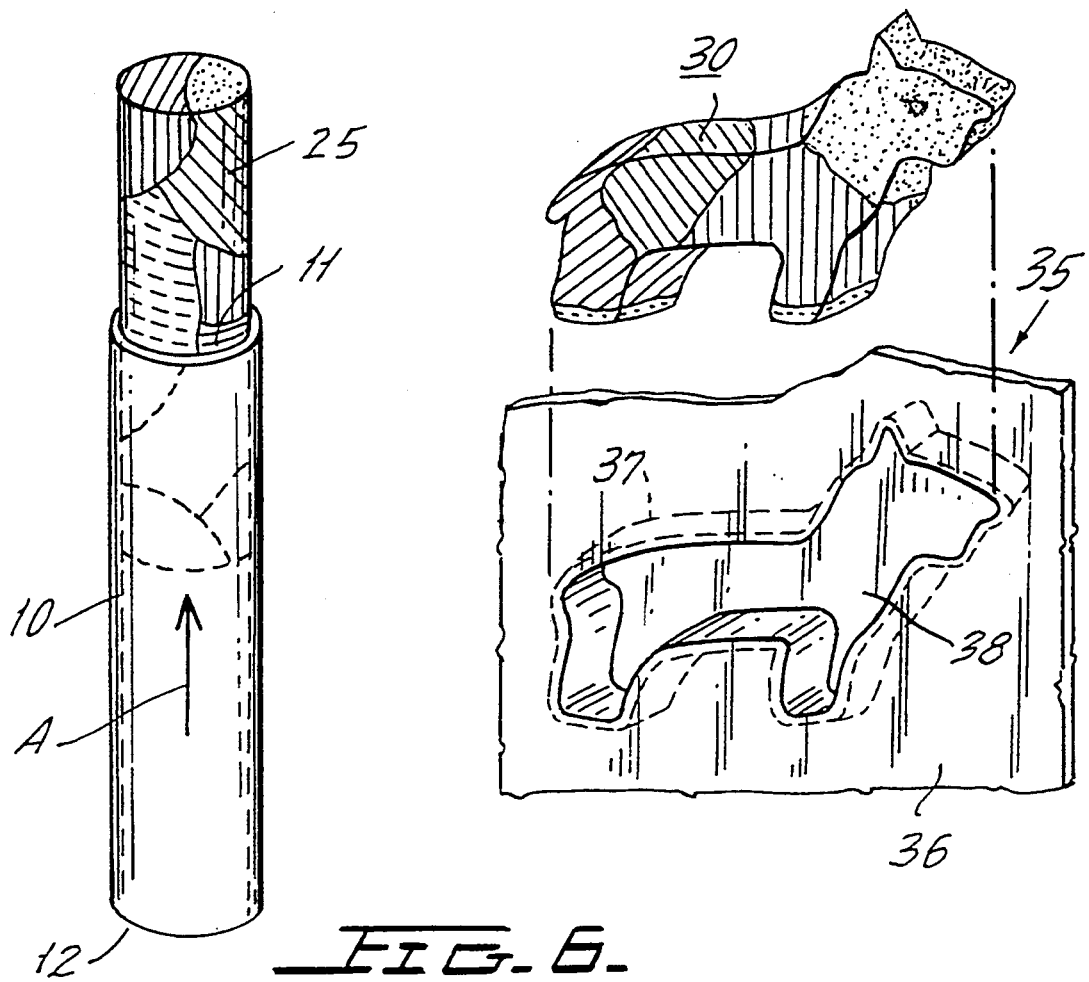
FIG. 7.
FIG. 6.

PROCESS FOR RECLAIMING SCRAPS OF CRAYON

BACKGROUND OF THE INVENTION

This invention relates to crayons in general and more particularly relates to a process for reclaiming scraps of crayon.

The construction of conventional crayons is such that normally there is a good deal of material which is wasted at the point where the crayon can no longer be used. Such waste is the result of crayon scraps that are produced, for example, when shaving the crayon to form a point, when pieces of the crayon break away and those pieces are to small to use for coloring purposes, and when the crayon has been used to a point where it becomes so short that it becomes a so-called nub that is to short to be held conveniently.

The prior art has sought to reclaim these scraps by melting them and then pouring the molten wax into a mold as disclosed in U.S. Pat. No. 4,188,009 entitled Apparatus For Molding Crayons And The Like, which issued to A. C. Gillespie on Feb. 12, 1980. In this Gillespie patent the reclamation apparatus requires a relatively expensive mold as well as a dedicated heater for melting the scraps.

SUMMARY OF THE INVENTION

In accordance with the instant invention crayon scraps are reclaimed by a process that requires relatively inexpensive non-metallic molds and does not require a heating source that is dedicated to the purpose of reclaiming crayon scraps. This is accomplished by forming the mold of a transparent tube having a removable plug or cover at its lower end. During melting of the scrap material the mold is in a non-metallic stabilizer to prevent the molten material from being spilled in the event the mold tips. Suitable for use as the stabilizer is a relatively short jar or other beaker-like container having a relatively small diameter mouth. A typical jar for baby food is suitable as the stabilizer. Heating of the crayon scraps to a molten condition takes place in an ordinary household microwave oven.

Accordingly, the primary object of the instant invention is to provide a novel method to reclaim crayon scraps, which method is readily practiced by unskilled persons.

Another object is to provide a method of this type that does not require the use of expensive equipment that is dedicated to this purpose.

Still another object is to provide a method of this type that utilizes microwave energy for turning solid scraps of crayon into a mass of molten material.

A further object is to enable young children to experience the fun of creating their own multi-colored crayons.

These objects as well as other objects of this invention shall become readily apparent after reading the following description of the accompanying drawings in which:

BRIEF DESCRIPTION OF THE DRAWINGS

FIG. 1 is a perspective of a transparent mold used to practice the method of the instant invention.

FIG. 2 is a perspective of the mold containing a charge of crayon scraps, with portions of the mold wall broken away to permit viewing of the charge.

FIG. 3 is a perspective of the elements in FIG. 2 inserted in a stabilizing unit.

FIG. 4 is an exploded perspective of the elements in FIG. 3.

FIG. 5 is a perspective of a domestic microwave oven with the elements of FIG. 3 inserted therein.

FIG. 6 is a perspective of a new crayon being unloaded from the mold of FIG. 1.

FIG. 7 is an exploded perspective of a mold for forming a new crayon having an animal-like shape.

DETAILED DESCRIPTION OF THE INVENTION

Now referring to the Figures. Transparent plastic mold 10 of FIG. 1 is an elongated cylinder which, in its upright normal or molding position has an upper end 11 that is open and a lower end 12 that is closed by removable plug or cover 14. The latter includes outwardly extending shoulder 15 that abuts bottom 12 of mold 10 to limit the insertion of plug 14 to the position shown in FIG. 1.

To carry out the process of the instant invention vegetable oil is poured into the elongated cavity defined by mold 10 and after making sure that the entire surface defining the cavity has been coated by the vegetable oil, excess vegetable oil is spilled from mold 10. The latter is then loaded or charged with crayon scraps which may include nubs 16 (FIG. 4) and/or shavings 17, etc. The loaded mold is placed in a shallow clear glass beaker 18 of small diameter which is proportioned so that in the event mold 10 tips it will not tip far enough to cause the contents of mold 10 to pour out of upper end 11. A small glass jar for baby food is a suitable substitute for beaker 18.

The elements of FIG. 3 are then inserted into microwave oven 20 of a type used for domestic cooking. Door 21 of oven 20 is closed and oven 20 is turned on. This generates microwave energy that heats the crayon scrap charge 22 in mold 10. First charge 22 glistens and shortly thereafter melting thereof begins from the bottom upward. This is observable through window 23 of oven door 21, transparent mold 14 and beaker 18. After scrap charge 22 becomes a single molten mass, oven 20 is turned off and charge 22 cools and solidifies to become a multicolor new crayon 25. The latter is removed from mold 10 through open top 11 thereof by first removing cover 14 from the bottom of mold 10 and then applying a force to crayon 25 in the direction of arrow A in FIG. 6.

By utilizing differently shaped molds, different crayon shapes may be formed. For example, multicolor crayon 30 of FIG. 7 is formed by utilizing thin-walled plastic mold 35 that includes flat base 36 a portion of which is drawn downward to form cavity 40. The latter is defined by wall 37 and floor 38, with wall 37 being shaped as the outline of an animal. Before charging cavity 40 with crayon scraps wall 37 and floor 38 are coated with a release agent, such as vegetable oil. The charged mold cavity 40 is then placed in a microwave oven which is turned on to heat the charge and transform same into a molten mass. The oven is then turned off and the molten mass cools to become animal-shaped multicolor new crayon 30.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of forming a new crayon from crayon scraps, said method including the steps of:
   (a) providing a nonmetallic mold having an open upper end, a lower end closed by a removable plug, and an elongated circular cross-section cavity;
   (b) placing a charge of solid crayon scraps in said cavity;
   (c) maintaining said mold in an upright molding position wherein its open upper end is positioned above its lower end while subjecting said charge to microwave energy to heat said scraps until they become a molten mass and cooling said molten mass until it solidifies into a new crayon; and then
   (d) removing said new crayon from said cavity by removing said plug and then applying a force to said new crayon at its end remote from said open upper end of said mold, which force is directed to drive said new crayon out of said cavity through said open upper end of said mold.

2. A method of forming a new crayon as set forth in claim 1 in which prior to performing said step (b) an oily coating is applied to said cavity to facilitate performance of said step (d).

3. A method of forming a new crayon as set forth in claim 2 in which:
   said crayon scraps include nubs and/or shavings; and
   some of said scraps are differently colored than are others of said scraps.

4. A method of forming a new crayon as set forth in claim 1 in which said step (c) is performed by mounting said mold to a non-metallic stabilizing unit that is operatively constructed to limit tipping of said mold from its upright molding position so as to prevent spilling of molten material from said cavity through its said first end.

5. A method of forming a new crayon as set forth in claim 1 in which said crayon scraps include nubs and/or shavings.

6. A method of forming a new crayon as set forth in claim 1 in which some of said scraps are differently colored than are others of said scraps.

7. A method of forming a new crayon as set forth in claim 1 in which said mold is transparent.

* * * * *